US012385617B2

(12) United States Patent
Zhu et al.

(10) Patent No.: US 12,385,617 B2
(45) Date of Patent: Aug. 12, 2025

(54) LAMP UNIT, HEADLAMP AND VEHICLE

(71) Applicant: HASCO VISION TECHNOLOGY CO., LTD., Shanghai (CN)

(72) Inventors: He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/689,444

(22) PCT Filed: Dec. 30, 2021

(86) PCT No.: PCT/CN2021/143202

§ 371 (c)(1),
(2) Date: Mar. 6, 2024

(87) PCT Pub. No.: WO2023/123235

PCT Pub. Date: Jul. 6, 2023

(65) Prior Publication Data

US 2024/0384850 A1 Nov. 21, 2024

(51) Int. Cl.
*F21S 41/32* (2018.01)
*F21S 41/148* (2018.01)
(Continued)

(52) U.S. Cl.
CPC ............. *F21S 41/32* (2018.01); *F21S 41/148* (2018.01); *F21S 41/285* (2018.01); *F21S 41/37* (2018.01);
(Continued)

(58) Field of Classification Search
CPC ........ F21S 41/00–43; F21S 41/65–675; F21W 2102/10–19; F21W 2107/10; F21Y 2115/10
See application file for complete search history.

(56) References Cited

U.S. PATENT DOCUMENTS 9,964,274 B2 * 5/2018 Lin ........................ F21S 41/33
2009/0103323 A1 4/2009 Ishida

FOREIGN PATENT DOCUMENTS

CN 103423685 A 12/2013
CN 103836484 A 6/2014
(Continued)

*Primary Examiner* — Jason M Han

(74) *Attorney, Agent, or Firm* — Bayramoglu Law Offices LLC

(57) ABSTRACT

Provided are lamp unit for headlamp, headlamp including lamp unit, and vehicle including headlamp. Lamp unit includes: lower beam light source, wherein the lower beam light source is configured to emit lower beams; high beam light source, wherein the high beam light source is configured to emit high beams; light distribution member, wherein the light distribution member includes lower beam reflecting surface, wherein the lower beam reflecting surface is configured to reflect part of the lower beams and guide them toward front of the lamp unit; and high beam reflecting surface, wherein the high beam reflecting surface is configured to reflect part of the high beams and guide them toward the front of the lamp unit; and lens, wherein the lens is arranged in front direction of the light distribution member and configured to refract the lower beams and the high beams to front of vehicle including the headlamp.

20 Claims, 3 Drawing Sheets

(51) Int. Cl.

| | |
|---|---|
| ***F21S 41/20*** | (2018.01) |
| ***F21S 41/37*** | (2018.01) |
| ***F21S 41/663*** | (2018.01) |
| ***F21W 102/135*** | (2018.01) |
| ***F21Y 115/10*** | (2016.01) |

(52) U.S. Cl.

CPC ...... *F21S 41/663* (2018.01); *F21W 2102/135* (2018.01); *F21Y 2115/10* (2016.08)

(56) References Cited

FOREIGN PATENT DOCUMENTS

| | | | |
|---|---|---|---|
| CN | 111076141 | A | 4/2020 |
| CN | 213542357 | U | 6/2021 |

* cited by examiner

LAMP UNIT, HEADLAMP AND VEHICLE

TECHNICAL FIELD

The present disclosure relates generally to a lamp unit, a headlamp including the lamp unit and a vehicle including the headlamp.

BACKGROUND ART

This part provides background information relevant to the present disclosure, but such information does not necessarily constitute the prior art.

The headlamp for the vehicle usually includes a lower beam light source for a lower beam function and a high beam light source for a high beam function. The lower beam function is configured for close-range illumination, so that the driver can identify any obstacles on the road surface within 100 meters in front of the vehicle, and the high beam function is configured for long-range illumination so that the driver has a wider view. In order to ensure driving safety, a high beam illumination distance of the vehicle usually needs to be greater than 100 meters.

In the related art, a distance between the lower beam light source and the high beam light source is closer, causing the heat emitted by the lower beam light source and the high beam light source to be more concentrated when using the headlamp. Therefore, the heat resistance of the headlamp is poorer. For example, the patent document CN112113181A provides a lamp unit to carry out illumination in a lower beam light distribution and a high beam light distribution by utilizing one light source substrate. However, in the lamp unit provided in the patent document, the lower beam light source and the high beam light source are arranged on the same light source substrate. Therefore, the heat emitted by the lower beam light source and the high beam light source is concentrated near the light source substrate, so that the heat resistance is poorer, thereby affecting the life of the lamp unit.

SUMMARY

This part provides a general summary of the present disclosure and is not a full disclosure of the full scope or all features of the present disclosure.

The objective of the present disclosure is to provide a lamp unit for the headlamp of the vehicle which can improve heat resistance and realize a function of integrated lighting of the high and lower beam.

Another objective of the present disclosure is to provide a lamp unit for the headlamp of the vehicle to improve a brightness in the vicinity of the low beam cutoff line.

Another objective of the present disclosure is to provide a lamp unit for the headlamp of the vehicle which can be applied to the adaptive driving beam mode.

The exemplary embodiments of the present disclosure provide a lamp unit for the headlamp, wherein the lamp unit can include a lower beam light source and the lower beam light source can be configured to emit lower beams; a high beam light source, wherein the high beam light source can be configured to emit high beams; a light distribution member, wherein the light distribution member can include a lower beam reflecting surface and a high beam reflecting surface, and the lower beam reflecting surface can be configured to reflect a part of the lower beams and guide them toward the front of the lamp unit, and the high beam reflecting surface can be configured to reflect a part of the high beams and guide them toward the front of the lamp unit; and a lens, wherein the lens can be arranged in a front direction of the light distribution member, and can be configured to refract the lower beams and the high beams to the front of the vehicle including the headlamp. The lower beam reflecting surface can include a lower beam front end and an opposite lower beam back end, and the high beam reflecting surface can include a high beam front end and a high beam back end which is opposite to the high beam front end and is lower than the high beam front end in a vertical direction. An edge of the lower beam front end can coincide with an edge of the high beam front end to form a cutoff structure. The lower beam light source can be arranged close to the lower beam back end and can be arranged to be higher than the lower beam back end in the vertical direction. The high beam light source can be arranged close to the high beam front end and below the high beam reflecting surface, and the high beam light source can be arranged to be lower than the high beam reflecting surface in the vertical direction.

In some embodiments, a lower beam reflecting surface connection part can be arranged between the lower beam front end and the lower beam back end. The lower beam reflecting surface can include a first lower beam reflecting surface extending from the lower beam back end to the lower beam reflecting surface connection part and a second lower beam reflecting surface extending from the lower beam front end to the lower beam reflecting surface connection part. The lower beam reflecting surface connection part can be lower than the lower beam back end in the vertical direction, and an angle can be formed on the lower beam reflecting surface connection part by the first lower beam reflecting surface with the second lower beam reflecting surface.

In some embodiments, an acute angle of the angle on the lower beam reflecting surface connection part between the first lower beam reflecting surface and the second lower beam reflecting surface can be greater than 150 degrees and smaller than 180 degrees.

In some embodiments, the acute angle of the angle on the lower beam reflecting surface connection part between the first lower beam reflecting surface and the second lower beam reflecting surface can be greater than 170 degrees and smaller than 180 degrees.

In some embodiments, the acute angle of the angle on the lower beam reflecting surface connection part between the first lower beam reflecting surface and the second lower beam reflecting surface can be 175 degrees.

In some embodiments, along a direction from the lower beam back end toward the lower beam front end, the lower beam reflecting surface connection part can be arranged at one-third to one-half of the lower beam reflecting surface.

In some embodiments, the lamp unit can further include a lower beam primary optical element and a high beam primary optical element. The lower beam primary optical element can be configured to converge and collimate the lower beams emitted from the lower beam light source, and the high beam primary optical element can be configured to converge and collimate the high beams emitted from the high beam light source. The lower beam primary optical element can be arranged in front of the lower beam light source, and the lower beam primary optical element can be arranged to be higher than the lower beam back end in the vertical direction. The high beam primary optical element can be arranged above the high beam light source, and is close to the high beam front end and below the high beam reflecting surface.

In some embodiments, the lower beam primary optical element can be a light converging cup-shaped element or a reflective mirror.

In some embodiments, the high beam light source can include a plurality of high beam LEDs which can be independently turned on and off. The lamp unit can be configured to turn off at least one of the plurality of high beam LEDs when a road user is detected in front of the vehicle including the headlamp.

In some embodiments, the lamp unit can include the high beam primary optical element configured to converge and collimate the high beams emitted from the high beam light source. The high beam primary optical element can include a plurality of microlenses matched with the plurality of high beam LEDs in one-to-one correspondence, and the high beam reflecting surface can include a plurality of curved surfaces connected to each other. The plurality of curved surfaces can be matched with the plurality of microlenses in one-to-one correspondence.

In some embodiments, each of the curved surfaces can be a convex surface protruding outwards relative to the high beam primary optical element.

In some embodiments, the convex surface protruding outwards toward the high beam primary optical element can be a cylindrical surface.

In some embodiments, each of the curved surfaces can be a concave surface recessed inwards relative to a direction away from the high beam primary optical element.

In some embodiments, the high beam reflecting surface can be a plane.

In some embodiments, the lower beam light source can be at least one lower beam LED.

In some embodiments, at least one of the high beam reflecting surfaces and the lower beam reflecting surface can be provided with a reinforcement structure for increasing the reflectivity of the corresponding high beams and/or lower beams.

In some embodiments, the reinforcement structure can be aluminum coated on the at least one of them.

The exemplary embodiments of the present disclosure further provide a headlamp for the vehicle, wherein the headlamp can include the lamp unit provided according to the foregoing embodiments.

The exemplary embodiments of the present disclosure further provide a vehicle, wherein the vehicle can include the headlamp provided according to the foregoing embodiments.

According to the above configurations, the lower beam light source can be arranged close to the lower beam back end and can be arranged to be higher than the lower beam back end in the vertical direction. The high beam light source can be arranged close to the high beam front end and below the high beam reflecting surface, and the high beam light source can be arranged to be lower than the high beam reflecting surface in the vertical direction. In this method, the lower beam light source and the high beam light source are spaced apart in both the vertical direction (the up and down direction) and the horizontal direction (the front and back direction), so that the lower beam light source can be spaced apart from the high beam light source by a larger distance; and thus the heat source is more dispersed. Therefore, it can realize the integrated illumination of the high and lower beams and the better heat resistance for the lamp unit.

Additionally, according to the above configurations, an angle is formed on the lower beam reflecting surface connection part by the first lower beam reflecting surface and the second lower beam reflecting surface, and the lower beam reflecting surface connection part is lower than the lower beam back end in the vertical direction. In this method, a part of the lower beams emitted from the lower beam light source is guided by the light distribution member into the cutoff structure which is closer to the light distribution member, so that the brightness in the vicinity of the cutoff line of lower beam pattern of the lamp unit is higher.

Additionally, according to the above configuration, the high beam light source includes the plurality of high beam LEDs which can be turned on and off independently, and the lamp unit can be configured to turn off at least one of the plurality of high beam LEDs when the road user is detected in front of the vehicle including the headlamp. In this method, the plurality of high beam LEDs can be individually addressed to control for turning off and turning on, thus enabling the adaptive driving beam mode.

BRIEF DESCRIPTION OF DRAWINGS

The features and advantages of the embodiments of the present disclosure will be more easily understood by the following description with reference to the drawings. The drawings are not drawn in proportions, which can show details of certain components by enlarging or reducing some features. The drawings are described as follows.

DETAILED DESCRIPTION OF EMBODIMENTS

Figure 1:
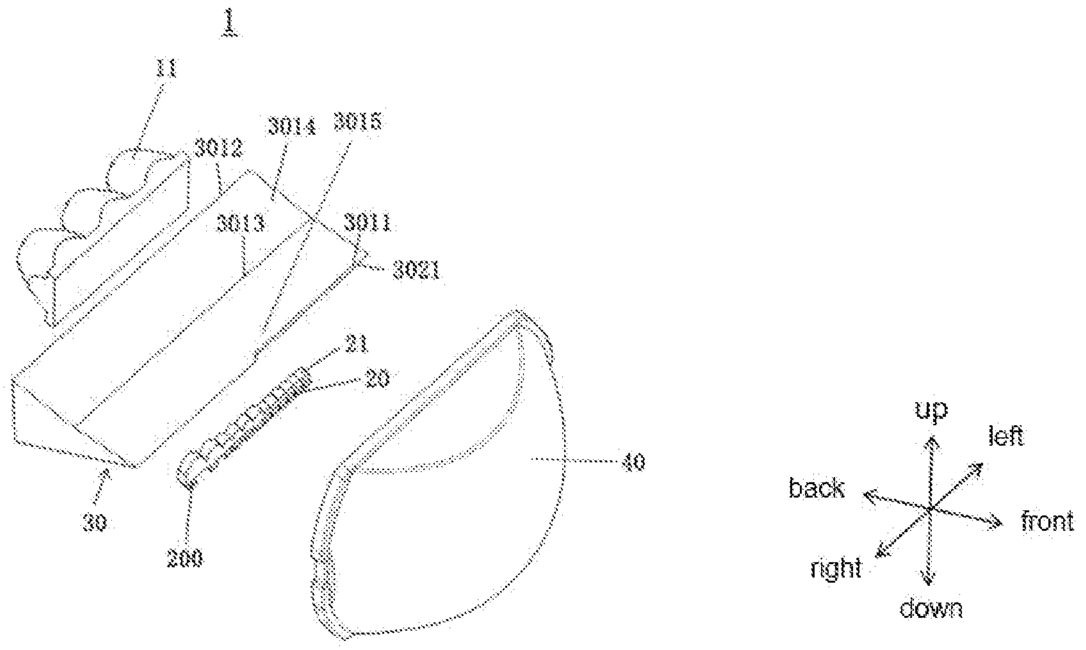
FIG. 1 shows a disassembled stereogram of a lamp unit for a headlamp according to the exemplary embodiments of the present disclosure.

The present disclosure will be described in detail below with reference to the drawings with the aid of the exemplary embodiments. It is to be noted that the following detailed description of the present disclosure is for illustrative purposes only, and is not a limitation of the present disclosure. Additionally, the same reference numbers in various drawings are used to denote the same components.

It is also noted that, for the sake of clarity, not all features of the actual specific embodiments are described and shown in the summary and the drawings. Moreover, to avoid unnecessary details blurring the technical solutions concerned in the present disclosure, only the device structures closely related to the technical solution of the present disclosure are described and shown in the drawings and the summary. Other details known to those skilled in the art and not significantly related to the technical contents of the present disclosure are omitted.

Next, a lamp unit for a vehicle headlamp provided according to the exemplary embodiments of the present disclosure will be described in detail with reference to the drawings.

FIG. 1 to FIG. 4 shows a lamp unit 1 for the headlamp according to the exemplary embodiments of the present disclosure. Referring to FIG. 1 to FIG. 4, the lamp unit 1 can include a lower beam light source 10 and a high beam light source 20, wherein the lower beam light source 10 can be configured to emit lower beams, and the high beam light source 20 can be configured to emit high beams.

As shown in FIG. 1 to FIG. 4, the lamp unit 1 can further include a light distribution member 30 and a lens 40 arranged in a front direction of the light distribution member 30. The lens 40 can be configured to refract the lower beams emitted from the lower beam light source 10 and the high beams emitted from the high beam light source 20 to the front of the vehicle including the lamp unit 1, as shown in FIG. 5.

In some embodiments, the light distribution member 30 can include a lower beam reflecting surface 301. The lower beam reflecting surface 301 can be configured to reflect a part of the lower beams emitted from the lower beam light source 10 and guide them toward the front of the lamp unit 1, as shown in FIG. 5. Referring to FIG. 1 to FIG. 5, the lower beam reflecting surface 301 can include a lower beam front end 3011 and a lower beam back end 3012 opposite to the lower beam front end 3011.

In some embodiments, the light distribution member 30 can also include a high beam reflecting surface 302. The high beam reflecting surface 302 is configured to reflect a part of the high beams emitted from the high beam light source 20 and guide them toward the front of the lamp unit 1, as shown in FIG. 5. The high beam reflecting surface 302 includes a high beam front end 3021 and a high beam back end 3022 which is opposite to the high beam front end 3021 and is lower than the high beam front end 3021 in a vertical direction, wherein the vertical direction is the up and down direction shown in FIG. 1. An edge of the high beam front end 3021 coincides with an edge of the lower beam front end 3011 to form a cutoff structure, as shown in FIG. 1-FIG. 5.

Referring to FIG. 1 to FIG. 5, in the exemplary embodiments, the lower beam light source 10 can be arranged close to the lower beam back end 3012, and the lower beam light source 10 can be arranged to be higher than the lower beam back end 3012 in the vertical direction. It can be understood that, in some embodiments, the lower beam light source 10 can include a light-emitting surface of the lower beam light source 100, and the light-emitting surface of the lower beam light source 100 can be arranged to be higher than the lower beam back end 3012 in the vertical direction.

Figure 4:
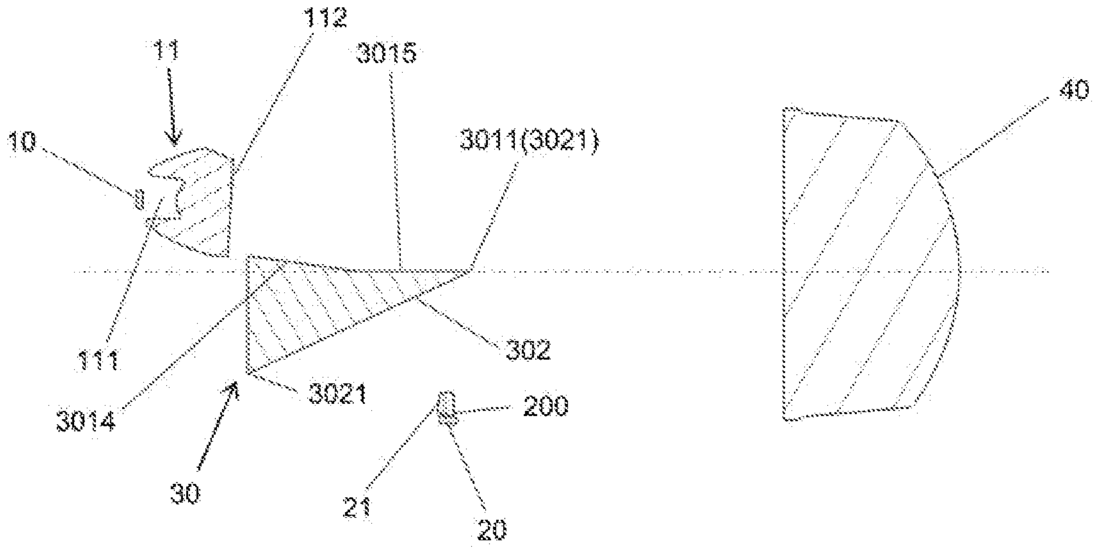
FIG. 4 shows a sectional view along line A-A in FIG. 3 of the lamp unit for the headlamp according to the exemplary embodiments of the present disclosure.
Figure 5:
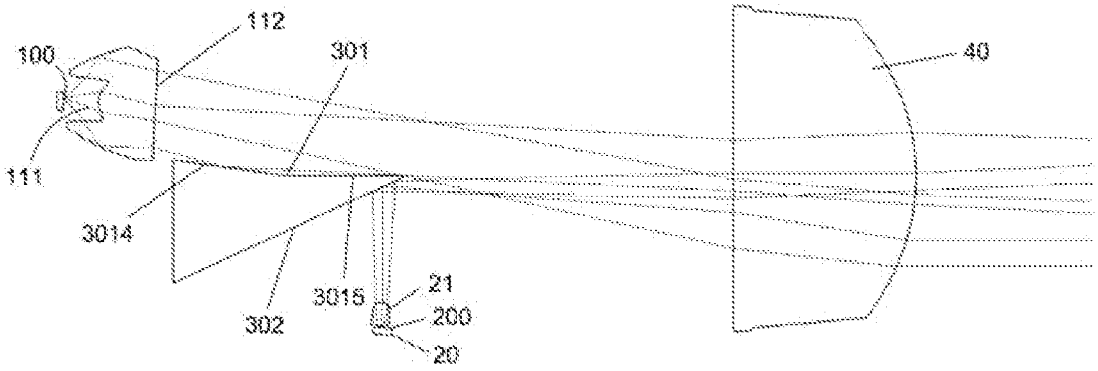
FIG. 5 shows a schematic diagram of directions of lights of the lamp unit for the headlamp according to the exemplary embodiments of the present disclosure.

Referring to FIG. 2 to FIG. 5, in some embodiments, the high beam light source 20 can be arranged close to the high beam front end 3021 and below the high beam reflecting surface 302, and the high beam light source 20 can be arranged to be lower than the high beam reflecting surface 302 in the vertical direction. It can be understood that, in some embodiments, the high beam light source 20 can include a light-emitting surface of the high beam light source 200, and the light-emitting surface of the high beam light source 200 can be arranged to be lower than the high beam reflecting surface 302 in the vertical direction, as shown in FIG. 4 and FIG. 5.

According to the exemplary embodiments of the present disclosure, the lower beam light source 10 is close to the lower beam back end 3012 of the lower beam reflecting surface 301 of the light distribution member 30 and is arranged to be higher than the lower beam back end 3012 in the vertical direction, and the high beam light source 20 is arranged close to the high beam front end 3021 and below the high beam reflecting surface 302. In this method, the lower beam light source 10 and the high beam light source 20 are spaced apart in both the vertical direction (the up and down direction) and the horizontal direction (the front and back direction), so that the lower beam light source 10 is spaced apart from the high beam light source 20 by a larger distance; and thus the heat source is more dispersed. Therefore, it can realize the integrated illumination of the high and lower beams and the better heat resistance for the lamp unit 1, thereby improving the service life of the lamp unit 1.

Figure 6:
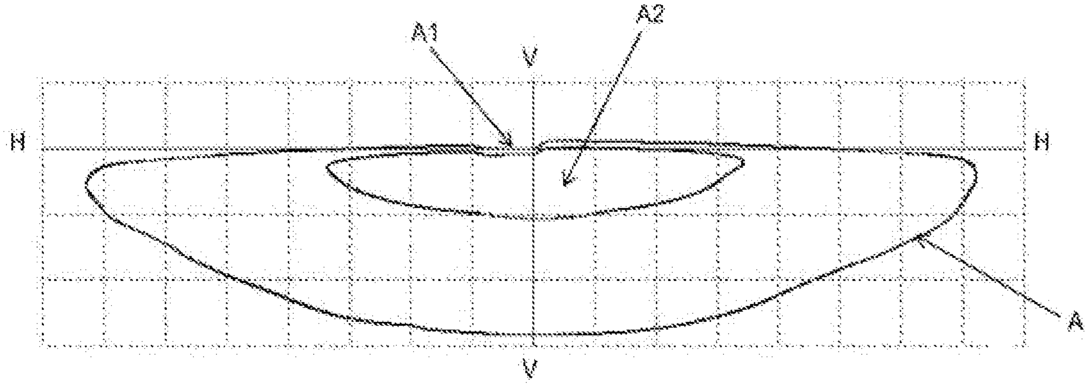
FIG. 6 shows a schematic diagram of a lower beam pattern of the lamp unit for the headlamp according to the exemplary embodiments of the present disclosure.

FIG. 6 shows a schematic diagram of a lower beam pattern A of the lamp unit 1 according to the exemplary embodiments of the present disclosure. Referring to FIG. 5 and FIG. 6, a part of the lower beams emitted from the lower beam light source 10 is irradiated to a cutoff structure of the light distribution member 30, so that a light-and-dark cut-off line A1 of the lower beam pattern A is formed. The light-and-dark cut-off line A1 indicates an upper boundary of the lower beam pattern A. It should be noted that the higher the brightness of the vicinity of the light-and-dark cut-off line A1 is, that is, the higher the illumination of the lower beam middle pattern A2 is, the better the visibility of the lower beam of the headlamp in the distance will be.

Referring back to FIG. 1 to FIG. 4, in some embodiments, a lower beam reflecting surface connection part 3013 can be arranged between the lower beam front end 3011 and the lower beam back end 3012 of the lower beam reflecting surface 301. According to the exemplary embodiments, along a direction from the lower beam back end 3012 toward the lower beam front end 3011, the lower beam reflecting surface connection part 3013 can be arranged at one-third to one-half of the lower beam reflecting surface 301. In this method, it is possible to improve the center brightness of the lower beam pattern and ensure the brightness of the entire lower beam pattern. Thus, the lower beam illumination can meet regulatory requirements, and further improvements are made to the lower beam pattern at the same time. The lower beam reflecting surface 301 can include a first lower beam reflecting surface 3014 extending from the lower beam back end 3012 to the lower beam reflecting surface connection part 3013 and a second lower beam reflecting surface 3015 extending from the lower beam front end 3011 to the lower beam reflecting surface connection part 3013.

According to the exemplary embodiments, the lower beam reflecting surface connection part 3013 is lower than the lower beam back end 3012 in the vertical direction. In other words, the first lower beam reflecting surface 3014 is tilted backward and upward relative to the second lower beam reflecting surface 3015, as shown in FIG. 1 to FIG. 4. In this method, through the reflecting effect of the first lower beam reflecting surface 3014, more lower beams can be guided to a region close to the cutoff structure of the light distribution member 30, so that the brightness in the vicinity of the light-and-dark cut-off line A1 of the lower beam pattern A is higher. Next, this will be described in detail with reference to FIG. 7.

Figure 7:
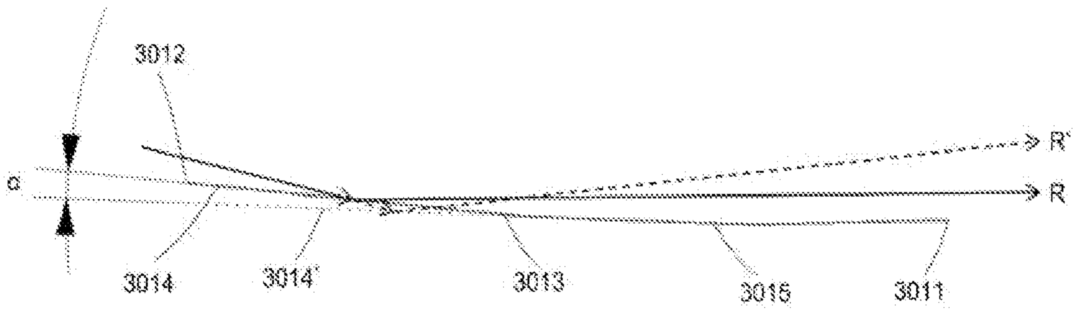
FIG. 7 shows a schematic diagram of the lower beam reflecting surface according to two different exemplary embodiments of the present disclosure.

FIG. 7 shows a schematic diagram of the lower beam reflecting surface 301 according to two different exemplary embodiments of the present disclosure. In some embodiments, the first lower beam reflecting surface 3014' and the second lower beam reflecting surface 3015 can be located on the same plane. For example, in FIG. 7, the first lower beam reflecting surface 3014' shown by a dashed line and the second lower beam reflecting surface 3015 shown by a solid line are located on the same plane, and a dashed arrow R' indicates a direction of the lower beams in this case.

In some other embodiments, the first lower beam reflecting surface 3014 and the second lower beam reflecting surface 3015 cannot be located on the same plane, and an angle is formed on the lower beam reflecting surface connection part 3013. For example, in FIG. 7, an angle is formed between the first lower beam reflecting surface 3014 shown by a solid line and the second lower beam reflecting surface 3015 shown by a solid line, and a solid arrow R indicates a direction of the lower beams when there is an angle.

As observed in FIG. 7, for the same incident beams, that is, for the same lower beams emitted from the lower beam light source 10, the direction of the lower beams indicated by the solid line arrow R will be closer to the cutoff structure of the light distribution member 30 relative to the direction of the lower beams indicated by the dashed line arrow R'. Therefore, when an angle is formed on the lower beam reflecting surface connection part 3013 by the first lower beam reflecting surface 3014 and the second lower beam reflecting surface 3015, the brightness in the vicinity of the light-and-dark cut-off line A1 of the lower beam pattern A is higher. That is, the higher the illumination of the lower beam middle pattern A2 is, the better the visibility of the lower beam of the headlamp in the distance will be.

According to the exemplary embodiments, the angle on the lower beam reflecting surface connection part 3013 of the first lower beam reflecting surface 3014 and the second lower beam reflecting surface 3015 is greater than 150 degrees and less than 180 degrees, preferably greater than 170 degrees and less than 180 degrees, and more preferably 175 degrees. In this method, it is possible to improve the center brightness of the lower beam pattern and ensure the brightness of the entire lower beam pattern, so that the lower beam illumination can meet the regulatory requirements and further improvements are made to the lower beam pattern at the same time. In other words, the angle $\alpha$, between an imaginary extension surface of the second lower beam reflecting surface 3015 in the direction toward the lower beam back end 3012 and the first lower beam reflecting surface 3014 at the lower beam reflecting surface connection part 3013, is greater than 0 degrees and less than 30 degrees, preferably greater than 0 degrees and less than 10 degrees, and more preferably 5 degrees, as shown in FIG. 7. In this case, the lower beams emitted from the lower beam light source 10 can be guided into the cutoff structure closer to the light distribution member 30 by the reflecting effective of the first lower beam reflecting surface 3014 to the lower beams. It should be noted that the angle between the first lower beam reflecting surface 3014 and the second lower beam reflecting surface 3015 can be configured specifically according to the desired lower beam pattern.

Referring back to FIG. 1 to FIG. 5, in some embodiments, the lamp unit 1 can further include a lower beam primary optical element 11, wherein the lower beam primary optical element 11 can be configured to converge and collimate the lower beams emitted from the lower beam light source 10. The lower beam primary optical element 11 can be arranged close to the lower beam back end 3012 of the light distribution member 30. The lower beam primary optical element 11 can include a light incident surface of the lower beam primary optical element 111 and a light-emitting surface of the lower beam primary optical element light 112, and the light incident surface of the lower beam primary optical element 111 can be arranged in front of the light-emitting surface of the lower beam light source 100. In some embodiments, at least a part of the light incident surface of the lower beam primary optical element 111 can face the light-emitting surface of the lower beam light source 100.

In some embodiments, as shown in FIG. 1 to FIG. 5, the lamp unit 1 can further include a high beam primary optical element 21, wherein the high beam primary optical element 21 can be configured to converge and collimate the high beams emitted from the high beam light source 20. The high beam primary optical element 21 can be arranged above the high beam light source 20, which is close to the high beam front end 3021 and below the high beam reflecting surface 302.

In some embodiments, at least one of the lower beam light sources 10 and the high beam light source 20 can include an LED to have a smaller light emitting area and a higher photoelectric conversion efficiency. However, it should be noted that the embodiments of the lower beam light source 10 and the high beam light source 20 are not limited thereto. For example, at least one of the lower beam light source 10 and the high beam light source 20 can also include a halogen lamp, a xenon lamp, etc.

Figure 2:
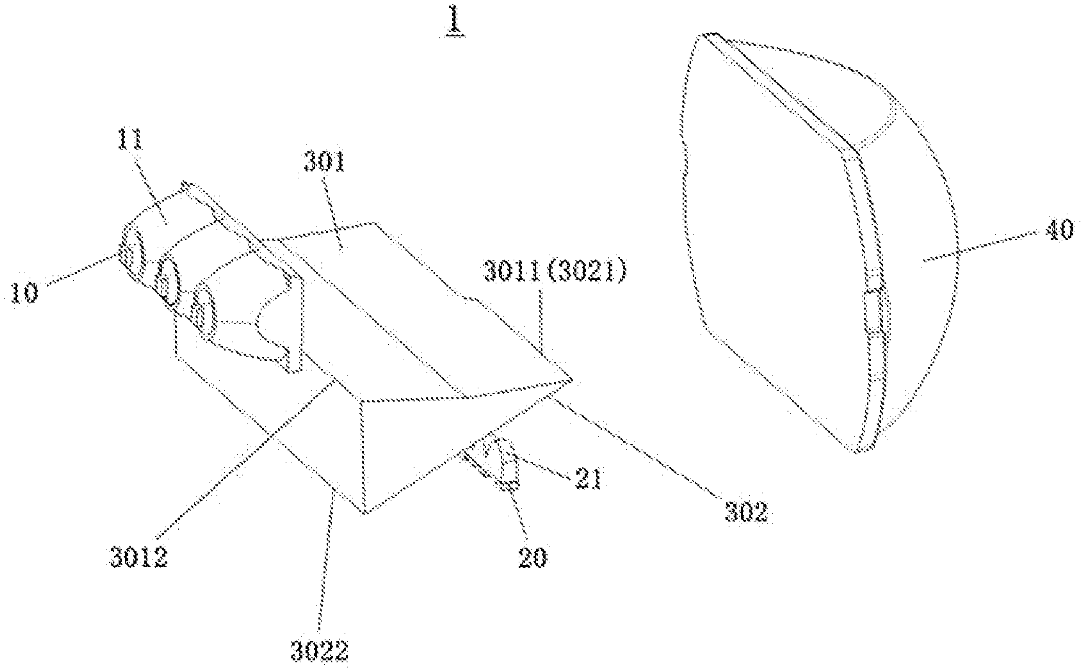
FIG. 2 shows a side view stereogram of the lamp unit for the headlamp according to the exemplary embodiments of the present disclosure.
Figure 3:
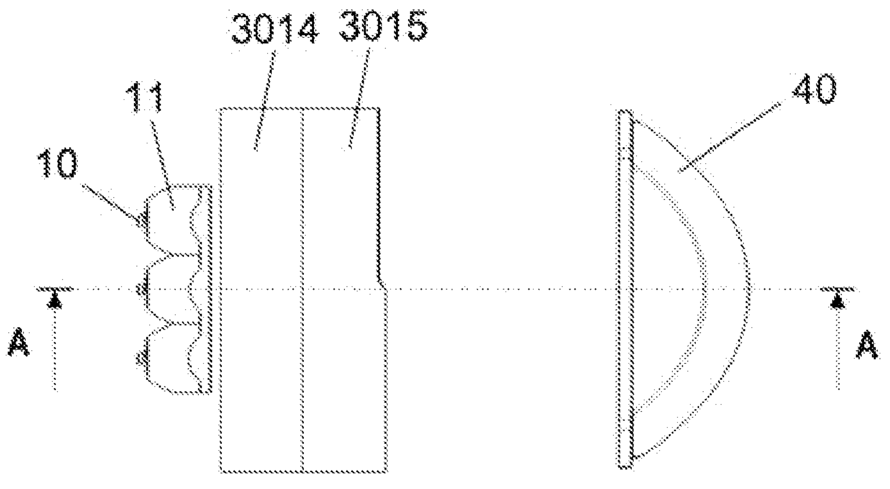
FIG. 3 shows a top view of the lamp unit for the headlamp according to the exemplary embodiments of the present disclosure.

In some embodiments, the lower beam primary optical element 11 can be a light converging cup-shaped element, as shown in FIG. 1 and FIG. 2. The light converging cup-shaped element can be flared-shaped or bowl-shaped including a large diameter end and a small diameter end, wherein the large diameter end of the light converging cup-shaped element is arranged close to the lower beam back end 3012, and the lower beam light source 10 is arranged close to the small diameter end of the light converging cup-shaped element. In some embodiments, the lower beam primary optical element 11 can include a plurality of light converging cup-shaped elements arranged side-by-side along a left and right direction. In the embodiments shown in FIG. 1 to FIG. 3, the lower beam primary optical element 11 includes three light converging cup-shaped elements. However, it can be understood that the number of light converging cup-shaped elements corresponds to the number of lower beam light sources 10, and is not limited to three. Additionally, it should also be noted that the structure of the lower beam primary optical element 11 is also not limited thereto. For example, the lower beam primary optical element 11 can also be a reflective mirror, etc.

It should be noted that, according to the specific arrangement of the lamp unit 1, the lower beam primary optical element 11 and the high beam primary optical element 21 can be omitted. For example, the LEDs serving as the lower beam light source 10 and the high beam light source 20 can emit the lower beams and high beams directly toward the lower beam reflecting surface and the high beam reflecting surface.

Figure 8:
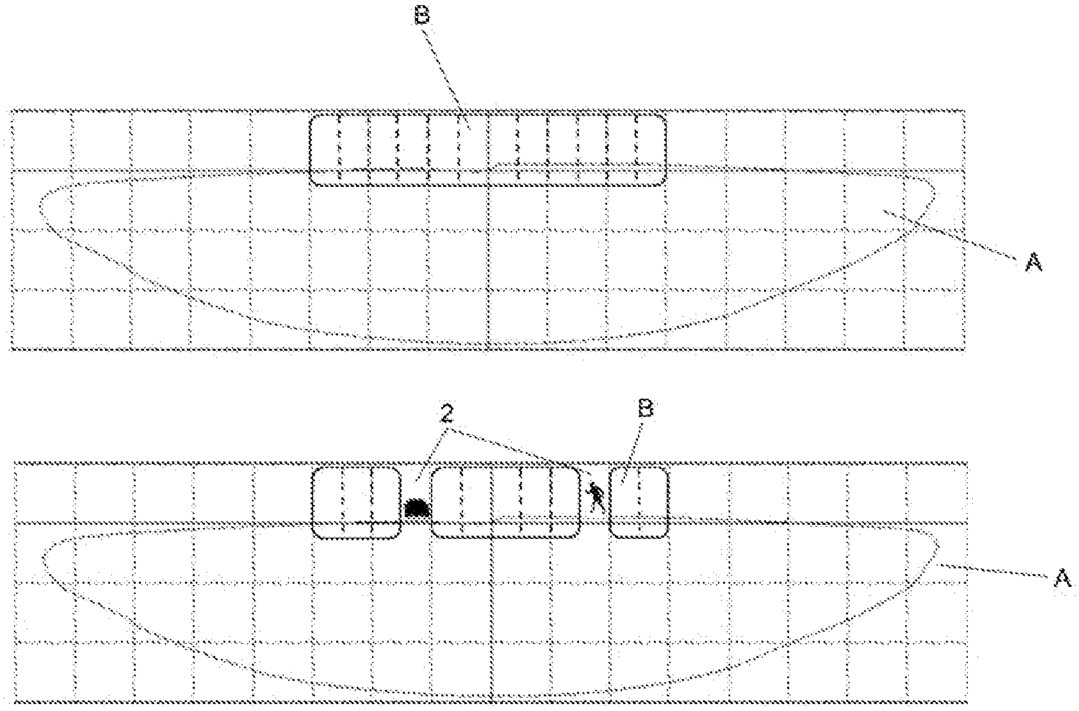
FIG. 8 shows a schematic diagram of beam patterns of a lower beam and an adaptive driving beam of the lamp unit for the headlamp according to the exemplary embodiments of the present disclosure.

Preferably, the high beam light source 20 can include a plurality of high beam LEDs which can be independently turned on and off. The lamp unit 1 can be configured to turn off at least one of the plurality of high beam LEDs when a road user 2 is detected in front of the vehicle including the lamp unit 1. In this method, the plurality of high beam LEDs can be individually addressed to control for turning off and turning on, thereby realizing the illumination mode of the ADB (adaptive driving beam). As shown in FIG. 8, at least a part of the LEDs in the high beam LEDs are turned off when there is the other road user 2 in front of the road. Therefore, a localized dark region is formed in the high beam pattern B of the adaptive driving beam, so as to avoid dazzling the other road user 2. It can avoid dazzling the driver especially if there is oncoming traffic on the road ahead, thereby greatly improving the safety of road driving.

In some embodiments, the high beam primary optical element 21 can include a plurality of microlenses matched with the plurality of high beam LEDs in one-to-one correspondence.

It should be understood, in this text, that when the expression "the component L is matched d with the component M in one-to-one correspondence" is in use, it should be understood that each component L is matched with one and only one component M. For example, it should be understood herein that each of the microlens is matched with one and only one of the LEDs. In the exemplary embodiments, the microlenses are matrix microlenses and the material of the microlenses is unlimited. For example, the microlenses can be made of transparent materials, such as silicone, PC, glass, PMMA, etc. According to the exemplary embodiments of the present disclosure, the high beams emitted from the high beam light source 20 are projected onto the high beam reflecting surface 302 of the light distribution member 30 after converged and collimated by the high beam primary optical element 21 including the microlenses.

In some embodiments, the high beam reflecting surface 302 of the light distribution member 30 can include a plurality of curved surfaces connected to each other, and the plurality of curved surfaces can be matched with the plurality of microlenses 201 in one-to-one correspondence. According to the exemplary embodiment, each of the curved surfaces of the high beam reflecting surface 302 can be a convex surface protruding outwardly relative to the high beam primary optical element 21. Preferably, the convex surface can be a cylindrical surface. Alternatively, each of the curved surfaces of the high beam reflecting surface 302 can be a concave surface recessed inwards relative to a direction of the high beam primary optical element 21. In some other embodiments, the high beam reflecting surface 302 can also be a plane. It should be understood that the shape of the high beam reflecting surface 301 can be specifically selected according to an actual light distribution design, so as to comply with the illumination requirements of the headlamp of the vehicle.

It should be noted that the specific shape of the light distribution member 30 is not limited. For example, the light distribution member 30 is shown in FIG. 1 to FIG. 5 with a proximately triangular cross-sectional shape. However, it is conceivable that the light distribution member 30 can have any other shapes, as long as the light distribution member 30 is provided with the lower beam reflecting surface 301 which can emit the lower beams emitted from the lower beam light source 10 as described above and the high beam reflecting surface 302 which can emit the high beams emitted from the high beam light source 20. It should be understood that, without departing from the scope of the present disclosure, the specific positions of the lower beam light source 10 and the high beam light source 20 can be suitably adjusted corresponding to different shapes of the light distribution member 30, so as to obtain a desired lower beam light pattern and desired high beam light pattern.

In some embodiments, at least one of the high beam reflecting surfaces 301 and the lower beam reflecting surface 302 can be provided with a reinforcement structure for increasing reflectivity of the corresponding high beams and/or lower beams emitted from the at least one of which, thereby improving the visibility of the lower beams and/or high beams at the distance of the vehicle. In some embodiments, the reinforcement structure can be aluminum coated on the lower beam reflecting surface 301 and/or high beam reflecting surface 302. It should be noted that the arrangement of the reinforcement structure is not limited thereto. For example, the lower beam reflecting surface 301 and/or the high beam reflecting surface 302 can be coated with other materials which can reinforce the light reflectivity.

Therefore, the lower beam light path and the high beam light path of the lamp unit 1 according to the exemplary embodiment of the present disclosure will be described again in detail with reference to FIG. 5.

The light path of the lower beams emitted from the lower beam light source 10 will be described first. Referring to FIG. 5, a part of the lower beams emitted from the lower beam light source 10 can be guided directly toward the front of the vehicle, and the other part of the lower beams can be reflected by the lower beam reflecting surface 301 and guided toward the front of the vehicle. In the case where the lower beam primary optical element 11 is provided, the lower beams emitted from the lower beam light source 10 can first be converged and collimated by the lower beam primary optical element 11, and a part of the lower beams can be projected directly to the lens 40 after converged and collimated, wherein the light-and-dark cut-off line A1 of the lower beam light pattern A will be formed by the lower beams projected to the cutoff structure after projected by the lens 40 (i.e., the upper boundary of the light pattern). Additionally, the other part of the lower beams after collimated and converged can be projected to the lower beam reflecting surface 301 (the first lower beam reflecting surface 3014 and the second lower beam reflecting surface 3015) of the light distribution member and reflected to the lens 40 via the lower beam reflecting surface 301, and then refracted to the front of the vehicle via the lens.

Next, the light path of the high beams emitted from the high beam light source 20 will be described. Referring to FIG. 5, a part of the high beams emitted from the high beam light source 20 can be reflected via the high beam reflecting surface 302 and guided toward the front of the vehicle. Although not shown in the drawings, it can be understood that a part of the high beams emitted from the high beam light source 20 can be guided directly toward the front of the vehicle without being reflected via the high beam reflecting surface 302. Additionally, it can be understood that in the case where the high beam primary optical element 21 is provided, the high beams emitted from the high beam light source 20 can first be converged and collimated by the high beam primary optical element 21, and a part of the high beams can be projected directly to the lens 40 after converged and collimated. The cut-off line of the high beam pattern will be formed by the high beams projected to the cutoff structure after being projected by the lens 40 (i.e., the lower boundary of the light pattern). Additionally, the other part of the high beams after collimated and converged can be projected to the high beam reflecting surface 302 of the light distribution member and reflected to the lens 40 via the high beam reflecting surface 30, and then refracted to the front of the vehicle via the lens 40.

According to the exemplary embodiments of the present disclosure, a headlamp including the foregoing lamp unit and a vehicle including the headlamp are further provided. It can be understood that the headlamp and the vehicle provided by the present disclosure can realize at least various advantages described above relative to the lamp unit 1.

INDUSTRIAL APPLICABILITY

The present disclosure provides a lamp unit for a headlamp, which includes the headlamp of the lamp unit and a vehicle of the headlamp. The lamp unit includes: a lower beam light source, wherein the lower beam light source is configured to emit lower beams; a high beam light source, wherein the high beam light source is configured to emit high beams; a light distribution member, wherein the light distribution member includes a lower beam reflecting surface and a high beam reflecting surface, and the lower beam reflecting surface is configured to reflect a part of the lower beams and guide them toward the front of the lamp unit, and the high beam reflecting surface is configured to reflect a part of the high beams and guide them toward the front of the lamp unit; and a lens, wherein the lens is arranged in a front direction of the light distribution member, and is configured to refract the lower beams and the high beams to the front of the vehicle including the headlamp. The lower beam reflecting surface includes a lower beam front end and an opposite lower beam back end, and the high beam reflecting surface includes a high beam front end and a high beam back end which is opposite to the high beam front end and is lower than the high beam front end in a vertical direction, wherein an edge of the lower beam front end coincides with an edge of the high beam front end to form a cutoff structure. The lower beam light source is arranged close to the lower beam back end and arranged to be higher than the lower beam back end in the vertical direction, and the high beam light source is arranged close to the high beam front end and below the high beam reflecting surface, and the high beam light source is arranged to be lower than the high beam reflecting surface in the vertical direction.

Additionally, it can be understood that the lamp unit, headlamp, and vehicle provided by the present disclosure are reproducible and can be applied in various industrial applications.

What is claimed is:

1. A lamp unit for a headlamp, wherein the lamp unit comprises:

a lower beam light source, wherein the lower beam light source is configured to emit lower beams;

a high beam light source, wherein the high beam light source is configured to emit high beams;

a light distribution member, wherein the light distribution member comprises a lower beam reflecting surface, wherein the lower beam reflecting surface is configured to reflect a part of the lower beams and guide them toward a front of the lamp unit; and a high beam reflecting surface, wherein the high beam reflecting surface is configured to reflect a part of the high beams and guide them toward the front of the lamp unit; and a lens, wherein the lens is arranged in a front direction of the light distribution member and is configured to refract the lower beams and the high beams to a front of a vehicle comprising the headlamp, wherein the lower beam reflecting surface comprises a lower beam front end and an opposite lower beam back end, and the high beam reflecting surface comprises a high beam front end and a high beam back end which is opposite to the high beam front end and is lower than the high beam front end in a vertical direction, and an edge of the lower beam front end coincides with an edge of the high beam front end to form a cutoff structure, the lower beam light source is arranged close to the lower beam back end, and the lower beam light source is arranged to be higher than the lower beam back end in the vertical direction, the high beam light source is arranged close to the high beam front end and below the high beam reflecting surface, and the high beam light source is arranged to be lower than the high beam reflecting surface in the vertical direction.

2. The lamp unit for the headlamp according to claim 1, wherein a lower beam reflecting surface connection part is arranged between the lower beam front end and the lower beam back end, and the lower beam reflecting surface comprises a first lower beam reflecting surface extending from the lower beam back end to the lower beam reflecting surface connection part and a second lower beam reflecting surface extending from the lower beam front end to the lower beam reflecting surface connection part, and the lower beam reflecting surface connection part is lower than the lower beam back end in the vertical direction, and an angle is formed on the lower beam reflecting surface connection part by the first lower beam reflecting surface and the second lower beam reflecting surface.

3. The lamp unit for the headlamp according to claim 2, wherein the angle is greater than 150 degrees and less than 180 degrees, preferably greater than 170 degrees and less than 180 degrees, and more preferably 175 degrees.

4. The lamp unit for the headlamp according to claim 3, wherein along a direction from the lower beam back end toward the lower beam front end, the lower beam reflecting surface connection part is arranged at one-third to one-half of the lower beam reflecting surface.

5. The lamp unit for the headlamp according to claim 2, wherein along a direction from the lower beam back end toward the lower beam front end, the lower beam reflecting surface connection part is arranged at one-third to one-half of the lower beam reflecting surface.

6. The lamp unit for the headlamp according to claim 2, wherein the lamp unit further comprises a lower beam primary optical element and a high beam primary optical element, wherein the lower beam primary optical element is configured to converge and collimate the lower beams emitted from the lower beam light source, and the high beam primary optical element is configured to converge and collimate the high beams emitted from the high beam light source, the lower beam primary optical element is arranged in front of the lower beam light source, and the lower beam primary optical element is configured to be higher than the lower beam back end in the vertical direction, and the high beam primary optical element is arranged above the high beam light source and is close to the high beam front end and below the high beam reflecting surface.

7. The lamp unit for the headlamp according to claim 2, wherein the high beam light source comprises a plurality of high beam LEDs which can be independently turned on and off, and the lamp unit is configured to turn off at least one of the plurality of high beam LEDs when a road user is detected in front of a vehicle comprising the headlamp.

8. The lamp unit for the headlamp according to claim 1, wherein the lamp unit further comprises a lower beam primary optical element and a high beam primary optical element, wherein the lower beam primary optical element is configured to converge and collimate the lower beams emitted from the lower beam light source, and the high beam primary optical element is configured to converge and collimate the high beams emitted from the high beam light source, the lower beam primary optical element is arranged in front of the lower beam light source, and the lower beam primary optical element is configured to be higher than the lower beam back end in the vertical direction, and the high beam primary optical element is arranged above the high beam light source, and is close to the high beam front end and below the high beam reflecting surface.

9. The lamp unit for the headlamp according to claim 8, wherein the lower beam primary optical element is a light converging cup-shaped element or a reflective mirror.

10. The lamp unit for the headlamp according to claim 1, wherein the high beam light source comprises a plurality of high beam LEDs which can be independently turned on and off, and the lamp unit is configured to turn off at least one of the plurality of high beam LEDs when a road user is detected in front of a vehicle comprising the headlamp.

11. The lamp unit for the headlamp according to claim 10, wherein the lamp unit comprises a high beam primary optical element configured to converge and collimate the high beams emitted from the high beam light source, wherein the high beam primary optical element comprises a plurality of microlenses matched with the plurality of high beam LEDs in one-to-one correspondence; and the high beam reflecting surface comprises a plurality of curved surfaces connected to each other, wherein the plurality of curved surfaces are matched with the plurality of microlenses in one-to-one correspondence.

12. The lamp unit for the headlamp according to claim 11, wherein each of the curved surfaces is a convex surface protruding outwards relative to the high beam primary optical element.

13. The lamp unit for the headlamp according to claim 12, wherein the convex surface is a cylindrical surface.

14. The lamp unit for the headlamp according to claim 11, wherein each of the curved surfaces is a concave surface recessed inwards relative to a direction opposite to the high beam primary optical element.

15. The lamp unit for the headlamp according to claim 1, wherein the high beam reflecting surface is a plane.

16. The lamp unit for the headlamp according to claim 1, wherein the lower beam light source comprises at least one lower beam LED.

17. The lamp unit for the headlamp according to claim 1, wherein at least one of the lower beam reflecting surface and the high beam reflecting surface is provided with a reinforcement structure for increasing a reflectivity of corresponding lower beams and/or high beams.

18. The lamp unit for the headlamp according to claim 17, wherein the reinforcement structure is aluminum coated on the at least one of the lower beam reflecting surface and the high beam reflecting surface.

19. A headlamp for a vehicle, wherein the headlamp comprises the lamp unit according to claim 1.

20. A vehicle, wherein the vehicle comprises the headlamp according to claim 19.

* * * * *